United States Patent
Labrum et al.

(10) Patent No.: US 10,113,645 B2
(45) Date of Patent: Oct. 30, 2018

(54) SEALING SYSTEM FOR TANK ROTARY SHAFT

(71) Applicant: Rio Tinto Alcan International Limited, Montreal (CA)

(72) Inventors: Deane Labrum, Forest Lake (AU); Dean Beltrame, Indooroopilly (AU); Guy Peloquin, Jonquière (CA); Alain Boivin, La Baie (CA)

(73) Assignee: Rio Tinto Alcan International Limited, Montreal (CA)

( * ) Notice: Subject to any disclaimer, the term of this patent is extended or adjusted under 35 U.S.C. 154(b) by 0 days.

(21) Appl. No.: 15/106,035

(22) PCT Filed: Dec. 4, 2014

(86) PCT No.: PCT/IB2014/002685
§ 371 (c)(1),
(2) Date: Jun. 17, 2016

(87) PCT Pub. No.: WO2015/092506
PCT Pub. Date: Jun. 25, 2015

(65) Prior Publication Data
US 2017/0002927 A1    Jan. 5, 2017

(30) Foreign Application Priority Data
Dec. 19, 2013 (EP) .................................... 13005928

(51) Int. Cl.
*F16J 15/34* (2006.01)
*F16J 15/00* (2006.01)
(Continued)

(52) U.S. Cl.
CPC ............ *F16J 15/008* (2013.01); *B65D 90/02* (2013.01); *F16J 15/3248* (2013.01); *F16J 15/3268* (2013.01)

(58) Field of Classification Search
CPC .. F16J 15/18; F16J 15/189; F16J 15/26; F16J 15/28; F16J 15/3268; F16J 15/3276; F16J 15/348; F16J 15/3484
See application file for complete search history.

(56) References Cited

U.S. PATENT DOCUMENTS 2,911,240 A    11/1959 Boutros et al.
3,129,010 A    4/1964 Stratienko
(Continued)

OTHER PUBLICATIONS

Feb. 24, 2015—International Search Report of PCT/IB2014/002685.

*Primary Examiner* — Gilbert Y Lee
(74) *Attorney, Agent, or Firm* — Banner & Witcoff, Ltd.

(57) ABSTRACT

A seal arrangement allowing in-line maintenance and replacement of packing, seals and bushings of a rotary shaft driving a tool extending inside a fluid holding tank. The rotary shaft and associated seals are mounted in an extractable cartridge removably insertable in sealing engagement within a housing projecting outwardly from the tank. A secondary seal comprises an isolation valve mounted to the housing outside of the tank for temporarily providing sealing during servicing of the seals in the extracted cartridge. A tertiary seal is provided for protecting the secondary seal from the tank contents when used in scaling environments. Removable parts of said seal arrangement.

20 Claims, 7 Drawing Sheets

(51) Int. Cl.
*F16J 15/3268* (2016.01)
*B65D 90/02* (2006.01)
*F16J 15/3248* (2016.01)

(56) References Cited

U.S. PATENT DOCUMENTS

| | | | |
|---|---|---|---|
| 3,246,902 A | | 4/1966 | Harrison |
| 3,459,430 A | | 8/1969 | Ball |
| 5,165,699 A | * | 11/1992 | Shrontz .................. F16J 15/406 |
| | | | 277/301 |
| 2005/0230921 A1 | * | 10/2005 | Zagres ................... F16J 15/006 |
| | | | 277/361 |

* cited by examiner

SEALING SYSTEM FOR TANK ROTARY SHAFT

CROSS-REFERENCE TO RELATED APPLICATIONS

The present application is a U.S. National Phase filing of International Application No. PCT/IB2014/002685, filed on Dec. 14, 2014, designating the United States of America and claiming priority to European Patent Application No. 13005928.0, filed Dec. 19, 2013, and the present application claims priority to and the benefit of both the above-identified applications, which are incorporated by reference herein in their entireties.

TECHNICAL FIELD

The application relates generally to tank shaft sealing systems and, more particularly, to a sealing system allowing maintenance or replacement of the shaft seals, bushings, packing and/or bearings without having to first empty the tank.

BACKGROUND OF THE ART

Over the years various sealing arrangements have been designed for rotatable shafts which extend into a fluid holding tank through a side opening below the fluid surface. The drive unit used for driving the rotary shafts are typically located outside the tank so that arrangements must be made for sealing the tank at the point of shaft entry. Packing and mechanical seals (e.g. rotary seals) for such purposes are well-known, but they are subject to wear and must be replaced from time-to-time.

Typically, when the worn packing or components of a mechanical seal need replacement, the contents of the tank must be drained or otherwise removed to prevent fluid escape from the shaft opening during the servicing operation. The emptying of the tank is a time-consuming and expensive process. Also it can potentially cause undesirable waste of some or all of the contents of the tank as well as contamination of the tank contents. In some applications, it can even expose the operators to potentially harmful substances.

U.S. Pat. No. 2,911,240 issued on Nov. 3, 1959 addresses the above issues by mounting an auxiliary sealing member inside the tank on an inboard end of a two-part rotary shaft. The shaft opening in the tank is temporarily sealed during servicing by moving the rotary shaft axially away from the tank to bring the auxiliary sealing member in sealing contact with a mating seal seat provided inside the tank. The auxiliary sealing member and the mating seat are exposed to the tank contents at all time. In some applications, the tank contents may compromise the operation of the auxiliary seal. This is particularly problematic in scaling environments where the build-up of material deposits on the sealing surfaces may prevent proper sealing engagement thereof.

Accordingly, there is a need to provide an improved sealing arrangement which addresses the above mentioned issues.

SUMMARY

It is therefore an object to provide a new tank shaft sealing arrangement allowing servicing of shaft seals without having to empty the tank from its content.

In accordance with a general aspect of the present invention, there is provided a seal arrangement for sealing a rotary shaft and a shaft opening defined in a wall of a tank containing a flowable material, sealing around the rotary shaft being provided by a primary seal (40, 50) mounted with said rotary shaft in an extractable cartridge, the seal arrangement comprising a secondary seal operational for closing the shaft opening when removing the primary seal for maintenance or replacement, characterized in that the extractable cartridge is removably insertable in sealing engagement within a housing projecting outwardly from the tank around the shaft opening, and in that the secondary seal comprises an isolation valve mounted to said housing outside of said tank.

Preferably, the seal arrangement further comprises the primary seal and/or the extractable cartridge. More preferably, the seal arrangement further comprises the rotary shaft.

According to another embodiment, the present invention also concern a seal arrangement for sealing a rotary shaft and a shaft opening defined in a wall of a tank containing a flowable material, the seal arrangement comprising: a primary seal providing sealing around the rotary shaft, and a secondary seal operational for closing the shaft opening when removing the primary seal for maintenance or replacement, characterized in that: the rotary shaft and the primary seal are mounted in an extractable cartridge removably insertable in sealing engagement within a housing projecting outwardly from the tank around the shaft opening, and in that the secondary seal comprises an isolation valve mounted to said housing outside of said tank.

Preferably, the seal arrangement further comprises a tertiary seal provided between the tank and the secondary seal for isolating the secondary seal from the flowable material in the tank during process operations. The tertiary seal allows to isolate the tank contents from the valve internals of the secondary seal during normal operation. The tertiary seal is particularly useful in scaling environments by preventing scale and mud from building around the valve member and the associated valve seat in the valve body.

Preferably, the tertiary seal is a compression/clamping type seal. More particularly, the compression/clamping type seal is provided at least in part by a distal end of the extractable cartridge which is held axially in sealing contact against a corresponding sealing face inside the housing when the extractable cartridge is securely fastened to the housing in a fully inserted position therein. More precisely, in its fully inserted position, the extractable cartridge extends through a passage defined in the isolation valve of the secondary seal, and to the sealing face.

According to one embodiment of the present invention, an injection valve operatively connectable to a source of pressurized fluid is provided for selectively pressurizing a gap between the housing and the extractable cartridge. A drain valve can also be provided on the housing for selectively draining said gap. The fluid pressure between the housing and the cartridge provides an additional seal to prevent the tank contents from flowing into the housing during process operation.

Preferably, the isolation valve of the secondary seal is a gate valve including a valve body forming part of said housing and defining a passage extending axially in line with the shaft opening of the tank, a valve member movable in a direction transversal to an axial direction of the passage between a normally open position in which the valve member is retracted to allow the passage of the extractable cartridge through the valve body and a closed position in which the valve member closes the passage defined in the valve body once the extractable cartridge has been sufficiently extracted so as to no longer obstruct movement of the valve member.

Preferably, the extractable cartridge has a mounting flange at a proximal end thereof, the mounting flange being adapted to be bolted to a corresponding mounting flange of the housing, and wherein bolting of the extractable cartridge to the housing urges the distal end of cartridge in sealing contact against the sealing face.

Preferably, the distal end of the extractable cartridge includes at least one replaceable sealing member.

Preferably, the rotary shaft has a distal end portion projecting out of the extractable cartridge, a first coupling member being fixedly mounted to said distal end portion for mating engagement with a second coupling member fixed to a tool extending into the tank, said first and second coupling members being axially disengageable. The first and second coupling members can have axial splines.

According to one embodiment of the present invention, the primary seal comprises a pair of rotary seals, and in that the extractable cartridge has a shell defining internal seats for accommodating the rotary seals and bushings. The primary seal could further comprise a stuffing box containing packing material compressed around the rotary shaft by a gland follower, the stuffing box being mounted at an outboard end of the cartridge.

The present invention also concerns removable parts of the above-described seal arrangement characterized in that it comprises the primary seal providing sealing around the rotary shaft and an extractable cartridge in which the rotary shaft and the primary seal are intended to be mounted.

Further details of these and other aspects of the present invention will be apparent from the detailed description and figures included below.

DESCRIPTION OF THE DRAWINGS

Reference is now made to the accompanying figures, in which.

DETAILED DESCRIPTION TO THE PREFERRED EMBODIMENTS

Figure 1:
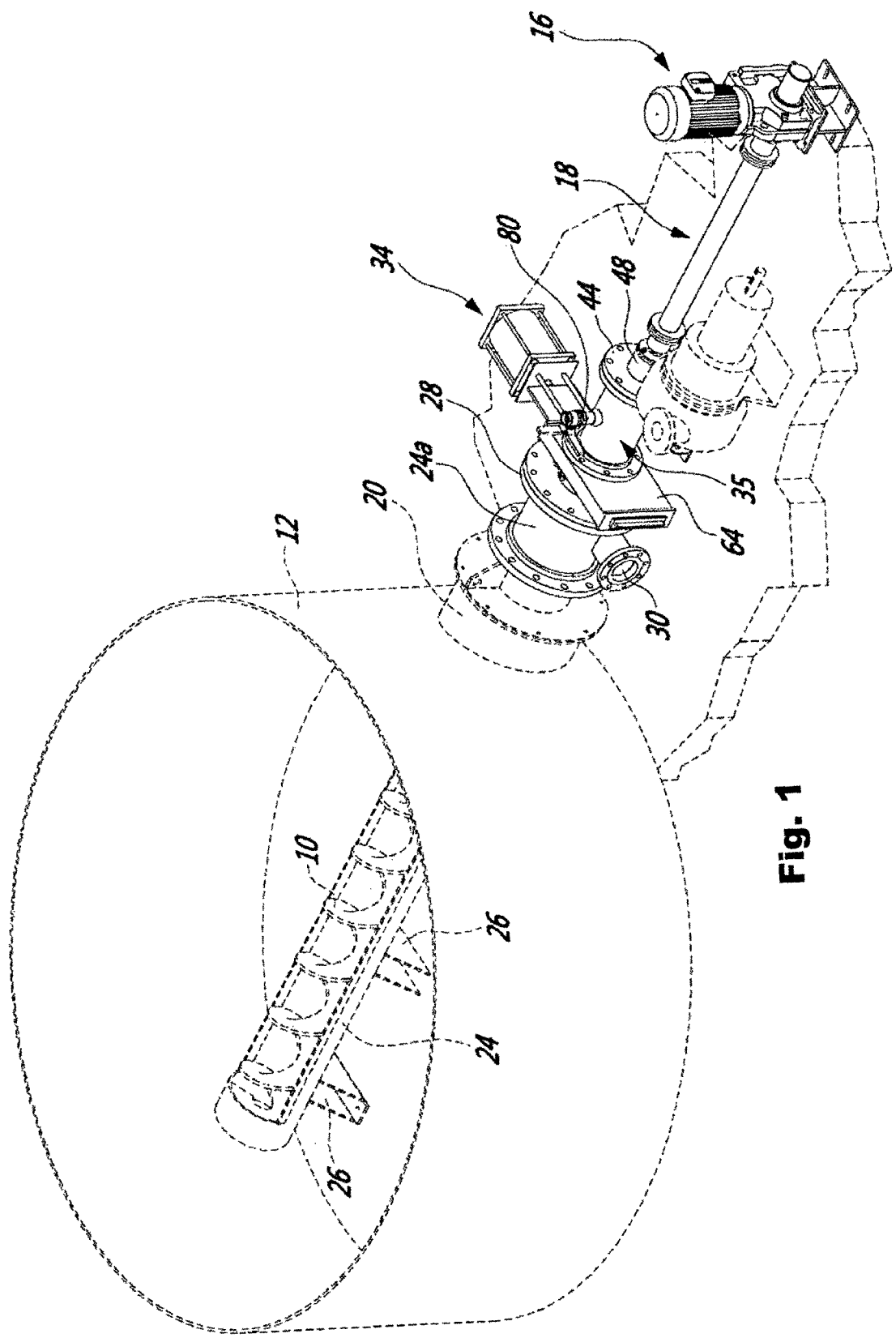
FIG. 1 is a perspective view of material processing equipment illustrative of an application in which a rotary shaft sealing system embodying elements of the present invention may be applied.

FIG. 1 is representative of an application to which the principles of the present invention may be applied. More particularly, FIG. 1 illustrates material processing equipment of the type used in the mining and metallurgy process industries, for processing flowable materials, such as slurries, pastes or other mud-like materials. This type of equipment includes among others: agitators, mixers, screw decanters, aerator and paste thickeners. In the exemplary embodiment of FIG. 1, the process equipment includes a tool, such as a screw 10, extending inside a tank 12 for admitting flowable material into the tank 12 and agitating the tank contents. The tank can be pressurized or not. The term "tank" is herein intended to broadly encompass receptacles, vessels or other open or closed structures adapted to hold flowable material. The screw 10 is driven in rotation by a rotary shaft 14 (FIG. 2) coupled to a drive unit 16 via a removable flexible coupling 18. The sidewall of the tank 12 has an outwardly projecting tubular port 20 defining an opening or passage through which the screw 10 penetrates the tank 12. The screw 10 may be disposed in a trough 24 supported in the tank 12 by axially spaced-apart supporting feet 26. For the purpose of the present description, the trough 24 is considered to form part of the tank structure. As best shown in FIGS. 3 and 4, the trough 24 projects out of the port 20 and is provided at its outboard end with a detachable inlet section 24a having a mounting flange 28 for connection with the rotary shaft support structure to be described hereinafter. The inlet section 24a of the trough 24 may also be provided with an inlet port 30 for admitting flowable material out of the tank 12.

Figure 2:
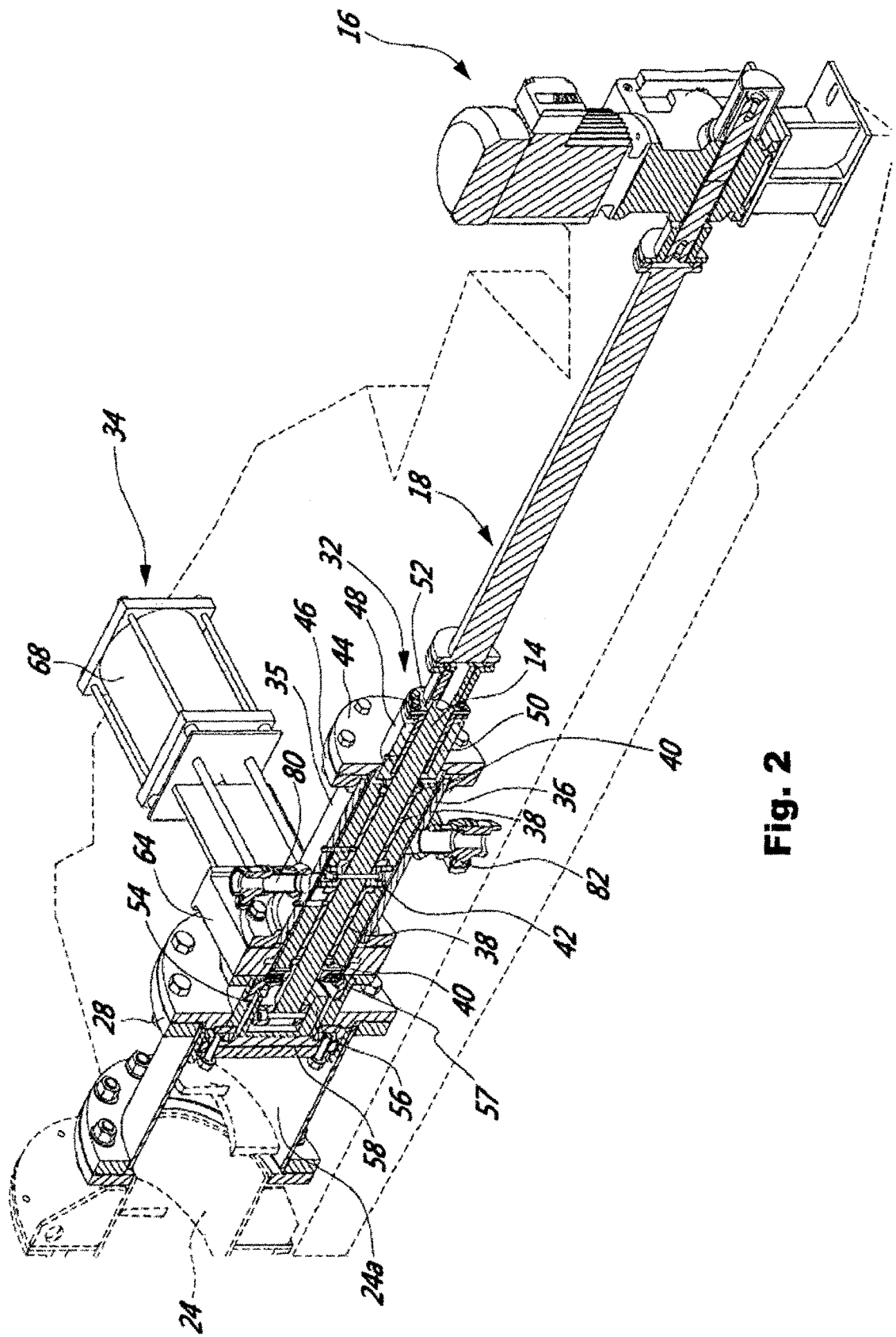
FIG. 2 is a perspective view in cross-section of the rotary shaft sealing system wherein the rotary shaft and associated primary seals are mounted in an extractable cartridge which may be readily removed from the tank for maintenance while a secondary seal temporarily closes the shaft opening in the tank wall, thereby allowing servicing of the shaft assembly without the need for emptying the tank.
Figure 3:
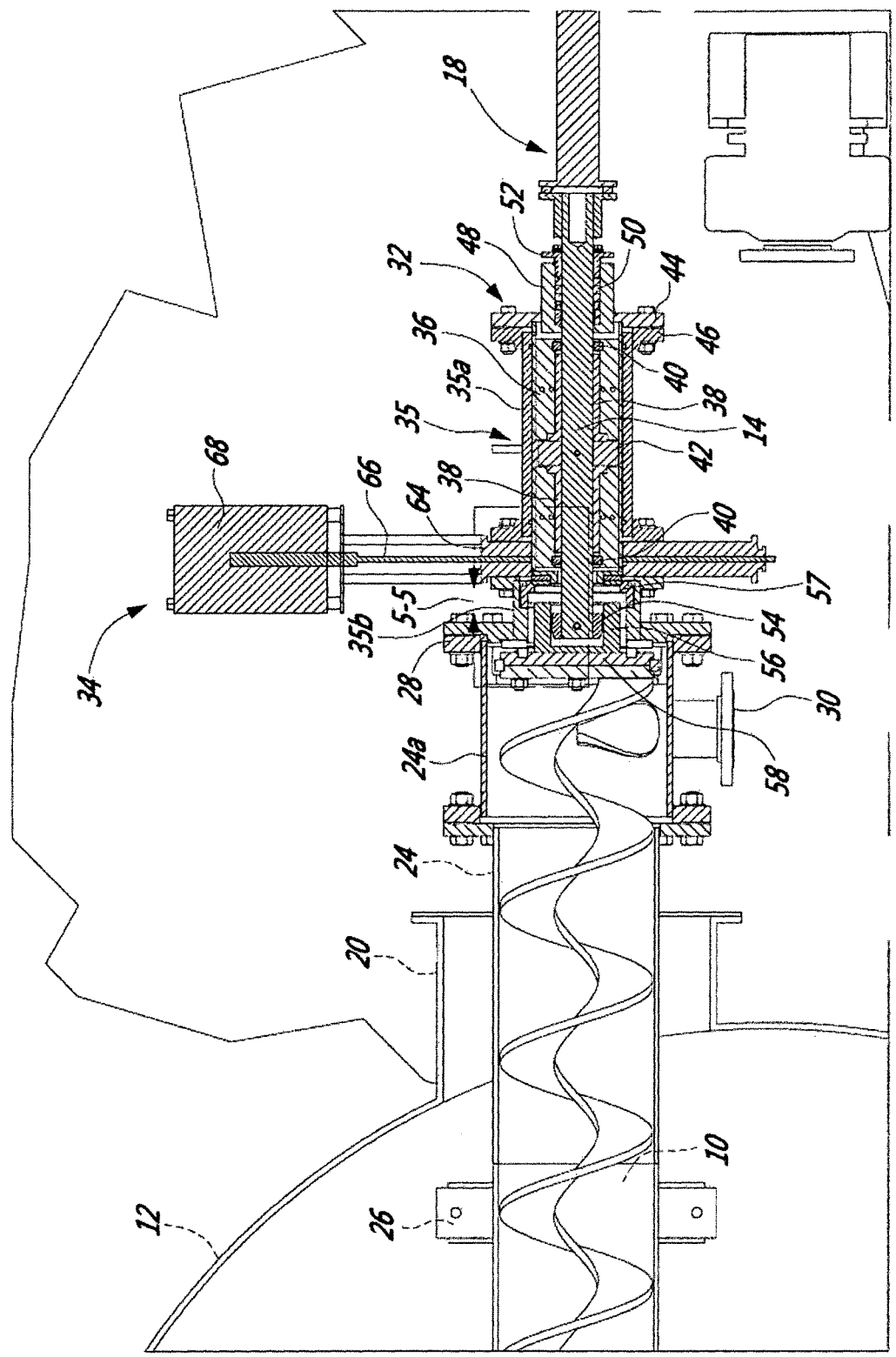
FIG. 3 is a cross-section view of the shaft sealing system with the cartridge fully inserted into its housing and with the rotary shaft operatively coupled to a screw extending into the tank for acting on the tank contents.
Figure 4:
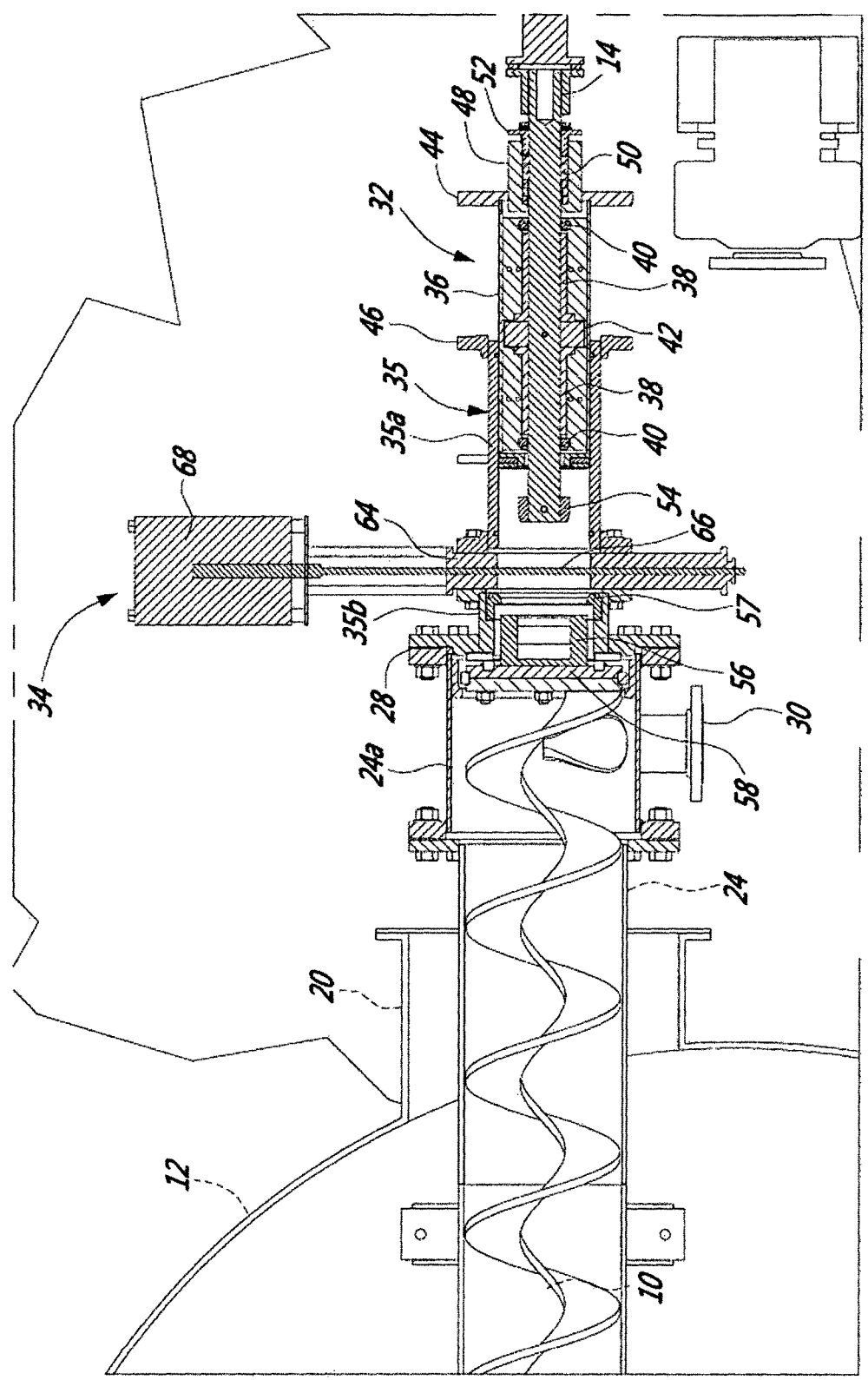
FIG. 4 is a cross-section view similar to FIG. 3 but illustrating the cartridge in a partially extracted position and with the secondary seal in an operative position to prevent fluid escape from the shaft opening while the seals of the shaft are being maintained or replaced.

FIGS. 2 to 4 illustrate the details of a shaft support and sealing system of the rotary shaft 14. As will be appreciated from the description below, this system is designed to enable servicing and replacement of the shaft packing, seals or support bearings without having to first empty the tank 12 from its content. Referring concurrently to FIGS. 2 to 4, it can be appreciated that this can be achieved by mounting the rotary shaft 14 and associated seals and bushings within an extractable cartridge 32 and by providing a secondary seal 34 outside of the tank 12 to provide isolation from the tank upon withdrawal of the cartridge 32.

As can be more clearly appreciated from FIGS. 3 and 4, the cartridge 32 is adapted to be axially loaded in and extracted from a housing 35 bolted to flange 28 at the outboard end of the trough 24. The cartridge 32 may include a cylindrical shell 36 adapted to contain the primary seals, which provide sealing around the shaft 14. For instance, the shell 36 may have internal seats for receiving rotary cup or lip seals 40 mounted about the rotary shaft 14. The shell 36 may also accommodate a spacer bushing and shaft stopper 42 securely mounted to the rotary shaft 14 between a pair of bushings 38. The shell 36 is slidable in sealing engagement with seals (not shown) provided on the inner surface of the housing 35. For instance, O-rings or the like may be mounted in circumferentially extending grooves defined in the inner surface of the housing 35 adjacent the entry end thereof. The shell 36 of the cartridge 32 may include a removable cover portion (not shown) to facilitate access to the bushings 38 and rotary cup seals 40 after the cartridge 32 has been extracted. The cartridge shell 36 is provided at an outboard or proximal end thereof with an annular mounting flange 44 adapted to be bolted to a corresponding mounting flange 46 on the housing 35. A stuffing box 48 may also be provided at the outboard end of the cartridge 32. Lubricating and sealing packing material 50 is provided in the stuffing box 48 about the rotary shaft 14. A gland follower 52 projects into the stuffing box 48 and is adjustably tightened thereto for compressing the lubricating and sealing packing material 50 against the shaft 14.

Figure 6:
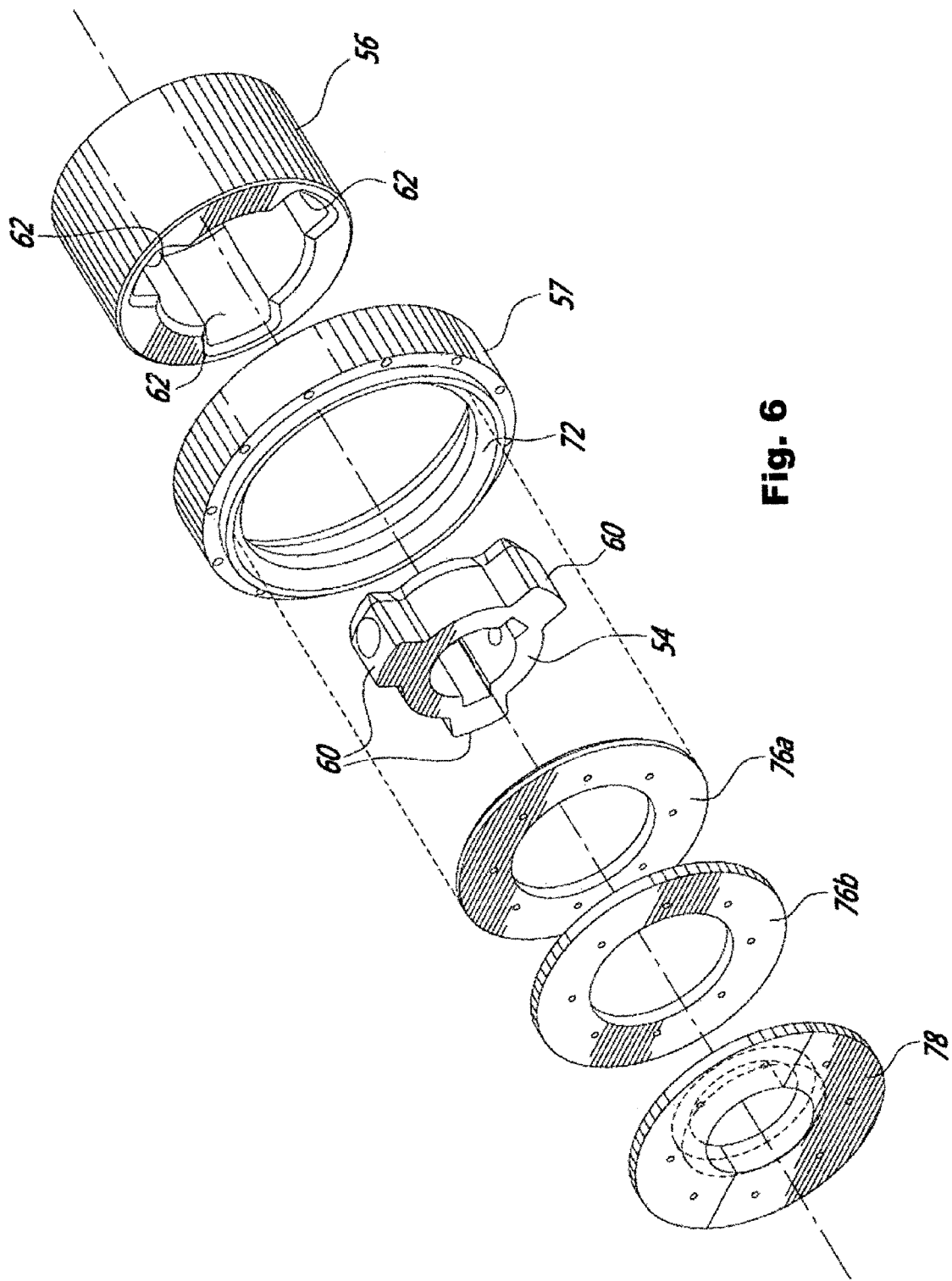
FIG. 6 is a perspective view illustrating the coupling components between the rotary shaft and the screw as well as the sealing components of a compression/clamping type seal used to protect the secondary seal from the tank contents during process operations.

As best shown in FIG. 4, the distal end of the rotary shaft 14 projects axially beyond the shell 36 of the extractable cartridge 32. A coupling member 54 is keyed and bolted to the distal end of the shaft 14 for mating engagement with a corresponding coupling member 56 bolted to the hub 58 of the screw 10. The coupling member 56 extends into the housing 35. As shown in FIG. 6, the coupling member 54 may be provided in the form of a male coupling having circumferentially distributed teeth 60 or external splines. The corresponding coupling member 56 on the screw 10 may be provided in the form of a female coupling having circumferentially distributed axially extending slots 62 or internal splines for mating engagement with teeth 60 of the male coupling 54. A tertiary seal seat 57 may be detachably mounted, such as by bolting, to the inside of second housing section 35*b* of the housing 35—for purposes to be described hereinafter. The tertiary seal seat 57 defines a central opening configured to permit the passage of the male coupling 54 on the rotary shaft 14. The teeth 60 of the male coupling 54 are adapted to be axially engaged in mating engagement with the internal slots 62 of the female coupling 56 to allow the rotary shaft 14 to drive the screw 10 in rotation, while allowing axial withdrawal of the male coupling 54 from the female coupling 56 by simply pulling the cartridge 32 away from the tank 12. It is understood that other types of couplings or splines could be used to allow the rotary shaft 14 to transmit a torque to the screw 10 while enabling axial separation thereof.

As shown in FIGS. 1 to 5, the secondary seal 34 for temporarily sealing the tank 10 when the cartridge 32 is extracted may be provided in the form of an isolation valve. According to the illustrated embodiment, the isolation valve is a gate valve having a valve body 64 forming part of the housing 35 in which the cartridge 32 is adapted to be loaded. The valve body 64 is mounted between first and second housing sections 35*a*, 35*b* of the housing 35 and defines an intermediate section of the housing passage for receiving the cartridge 32. For instance, the valve body 64 may be bolted to mounting flanges provided at the ends of the housing sections 35*a*, 35*b*. The gate valve further comprises a valve member 66, which may take the form of a knife gate, movable in a direction transversal to an axial direction of the cartridge passage or loading direction between a normally open position (FIG. 3) in which the valve member 66 is retracted to allow the passage of the extractable cartridge 32 through the valve body 64 and a closed position (FIG. 4) in which the valve member 66 closes the passage defined in the valve body 64 once the extractable cartridge 32 has been sufficiently extracted from the housing 35 so as to no longer obstruct the movement of the valve member 66. An actuator 68 may be provided for reciprocating the valve member 66 between its open and closed positions.

Figure 5:
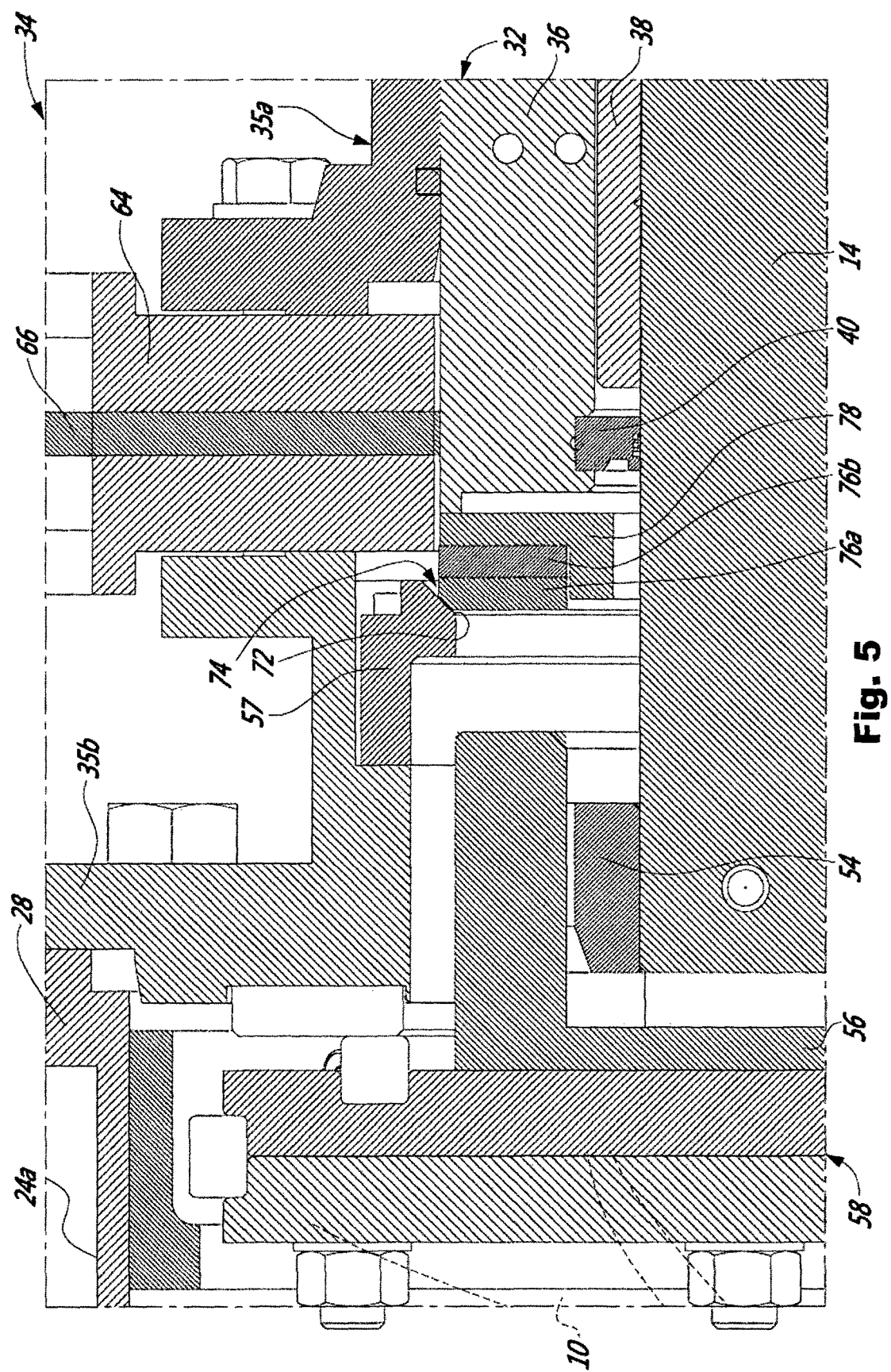
FIG. 5 is an enlarged cross-section view of area 5-5 shown in FIG. 3.

Now referring concurrently to FIGS. 3 and 5, it can be appreciated that the distal or inboard end of the cartridge shell 36 may be axially urged in sealing contact with a corresponding sealing face 72 on the tertiary seal seat 57, thereby providing a tertiary seal 74 between the tank 12 and the secondary seal 34 (the gate valve in the illustrated embodiment) to isolate the tank contents from the valve internals of the secondary seal 34 during normal operation. The bolts (not shown) used to fasten the mounting flange 44 of the cartridge 32 to the mounting flange 46 of the housing 35, axially clamp the distal end of the cartridge 32 in sealing contact with the sealing face 72 of the tertiary seal seat 57, thereby providing a compression/clamping type seal. The distal end of the cartridge 32 is used as a clamp valve plug and the front face of the tertiary seal seat 57 provides a mating valve seat. The tertiary seal 74 is, thus, obtained by simply bolting the cartridge 32 in position within the housing 35 without the need for any other dedicated operations. Replaceable sealing plates 76 (FIGS. 5 and 6) mounted to an end cap 78 of the cartridge 32 may be provided to ensure proper operation of the tertiary seal 74 over time. Accordingly, when worn out, the sealing plates 76 can be replaced to maintain the integrity of the seal.

Now referring back to FIG. 2, it can be seen that an injection valve 80 and a drain valve 82 may be provided on the first section 35*a* of the housing 35. The injection valve 80 is adapted to be connected to a source of pressurized fluid (not shown), such as water, to pressurize the gap between the housing 35 and the cartridge 32. The fluid pressure between the housing 35 and the cartridge 32 provides an additional seal to prevent the tank contents from flowing into the housing 35 during process operation. According to the illustrated embodiment, it particularly contributes to ensuring that the secondary seal 34 remains free from scale and mud during operation. During extraction of the cartridge 32, the sealing engagement between the cartridge 32 and the housing 35 allows the pressurized fluid (e.g. the flush water) to remain pressurized. Flushing of the pressurized fluid during reinstallation of the cartridge 32 ensures the clamp valve plug and seat are free from mud and scale, thereby providing for uniform sealing contact therebetween.

When the seals of the rotary shaft 14 need to be maintained or replaced, the removable flexible coupling 18 (FIG. 1) is first removed to provide sufficient space for the cartridge 32 to be axially withdrawn from the housing 35. Then, the bolts securing the cartridge 32 to the housing 35 are removed and the cartridge 32 is gradually pulled out from the housing 35, as shown in FIG. 4. The axial withdrawal of the cartridge 32 automatically disengages the rotary shaft 14 from the screw 10. This is rendered possible by the axial spline connection between the rotary shaft 14 and the screw 10. During withdrawal, the cartridge 32 maintains a pressure seal to seal the housing 35 and tank 12 while being extracted far enough to allow the secondary seal 34 to move from its open position (FIG. 3) to its closed position (FIG. 4). Once the secondary seal 34 is closed, as shown in FIG. 4, the cartridge 32 is fully extracted from the housing 35 for servicing the shaft seals and bushings. As best shown in FIG. 4, the cartridge 32 allows removal of the rotary shaft 14, the bushings 38, the rotary seals 40, the stuffing box 48, the packing 50 and the gland follower 52 all at once as a single unit. After having been removed, the cartridge 32 can be opened to give access to the bushings 38 and the rotary seals 40. Also, the packing 50 in stuffing box 48 may be readily replaced by un-tightening the gland follower 52. During all the maintenance operations, the tank 12 is isolated from the housing 35 by the secondary seal 34 (i.e. the gate valve in the illustrated embodiment), thereby eliminating the need to empty the tank 12 for servicing the shaft seals.

After servicing the cartridge 32, or a whole replacement cartridge 32, the cartridge 32 is engaged into the housing 35, the secondary seal 34 is moved back to its open position to clear the passage and the cartridge 32 is axially pushed to its fully inserted position, as shown in FIG. 3. In this position, the male coupling 54 on the rotary shaft 14 is in mating engagement with the female coupling 56 attached to the screw 10. It is noted that during reinstallation, the injection valve 80 and the drain valve 82 may be opened to flush any scale or mud that may have passed from the tank 12 to the housing 35, particularly in the housing section 35b and the valve body 64. Thereafter, the cartridge 32 is re-bolted to the housing 35, thereby axially clamping the replaceable seals 76a, 76b at the distal end of the cartridge 32 in sealing contact with the sealing face 72 on the tertiary seal seat 57. Finally, the drain valve 82 is closed to allow pressurization of the gap between the cartridge 32 and the housing 35.

Figure 7:
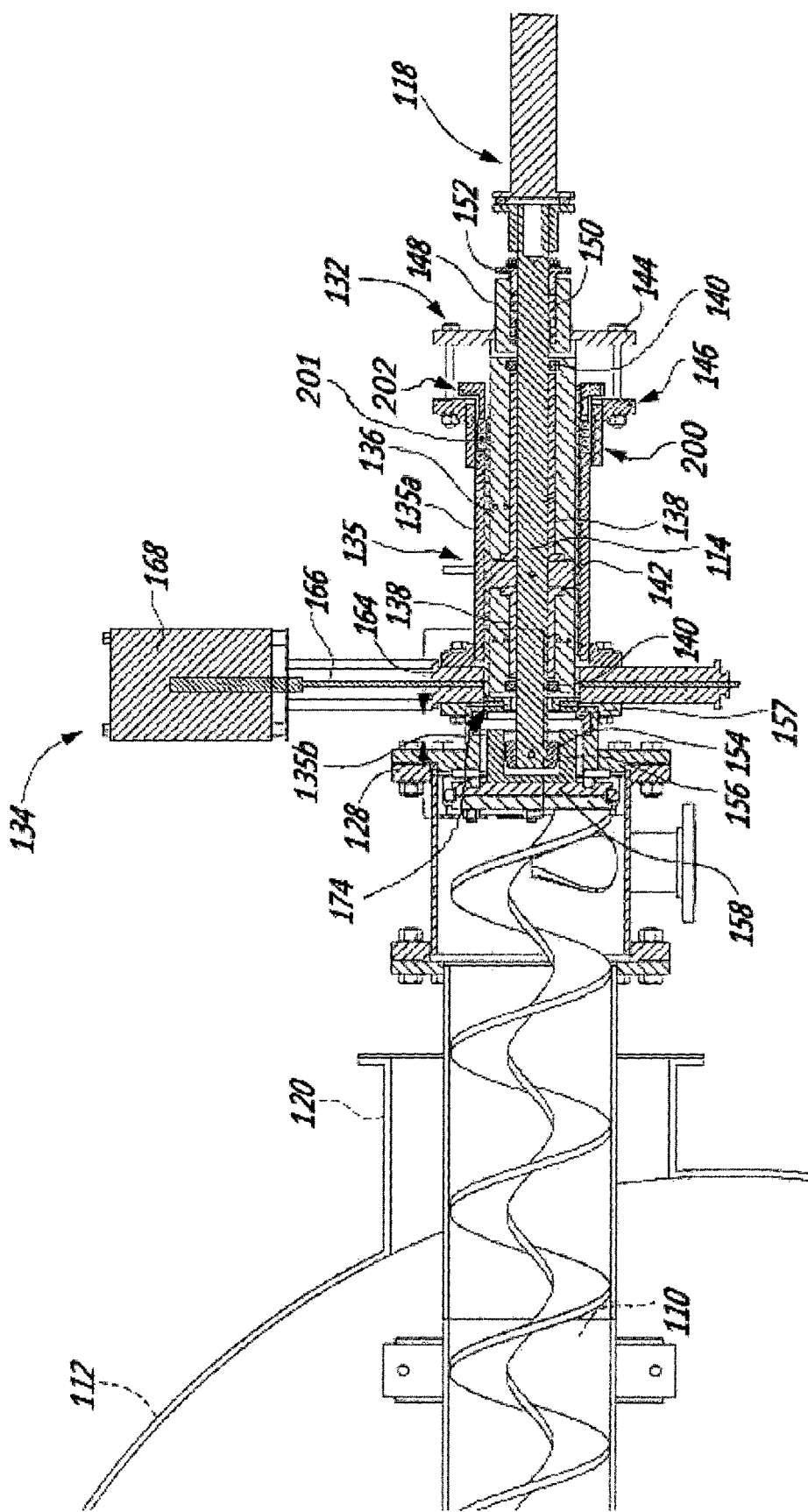
FIG. 7 is a cross-section view of a rotary shaft sealing system according to another embodiment of the present invention.

Now referring to FIG. 7 representing a rotary shaft sealing system according to another embodiment of the present invention, the system includes most of the technical elements of the system represented in FIGS. 1 to 6, as well as additional mechanical parts and functionalities that will be described hereafter in more details.

As in the embodiment shown in FIGS. 1 to 6, the process equipment of FIG. 7 includes a screw 110, extending inside a tank 112 and driven in rotation by a rotary shaft 114 coupled to a drive unit via a removable flexible coupling 118. The screw 110 penetrates the tank 112 through an opening defined by an outwardly projecting tubular port 120.

As in the embodiment shown in FIGS. 1 to 6, the rotary shaft sealing system, a rotary shaft 114 and associated seals and bushings are mounted within an extractable cartridge 132 adapted to be axially loaded in and extracted from a housing 135 bolted to flange 128. The cartridge 132 includes a cylindrical shell 136 adapted to contain primary seals, which provide sealing around the shaft 114. For instance, the shell 136 may have internal seats for receiving rotary cup or lip seals 140 mounted about the rotary shaft 114. The shell 136 may also accommodate a spacer bushing and shaft stopper 142 securely mounted to the rotary shaft 114 between a pair of bushings 138. The shell 136 is slidable in sealing engagement with cartridge seals provided on the inner surface of the housing 135.

As in the embodiment shown in FIGS. 1 to 6, the cartridge shell 136 is provided at an outboard or proximal end thereof with an annular mounting flange 144 adapted to be bolted to a corresponding mounting flange 146 on the housing 135. A stuffing box 148 may also be provided at the outboard end of the cartridge 132. Lubricating and sealing packing material 150 is provided in the stuffing box 148 about the rotary shaft 114. A gland follower 152 projects into the stuffing box 148 and is adjustably tightened thereto for compressing the lubricating and sealing packing material 150 against the shaft 114.

As in the embodiment shown in FIGS. 1 to 6, the distal end of the rotary shaft 114 projects axially beyond the shell 136 of the extractable cartridge 132. A coupling member 154 is keyed and bolted to the distal end of the shaft 114 for mating engagement with a corresponding coupling member 156 bolted to the hub 158 of the screw 110. The coupling member 156 extends into the housing 135.

As in the embodiment shown in FIGS. 1 to 6, a secondary seal 134 may be provided outside of the tank 112, in the form of an isolation valve, for temporarily sealing said tank when the cartridge 132 is extracted. The isolation valve is a gate valve having a valve body 164 forming part of the housing 135 and mounted between first and second housing sections 135a, 135b of the housing 135. The gate valve further comprises a valve member 166 and an actuator 168.

As in the embodiment shown in FIGS. 1 to 6, a tertiary seal seat 157 may be detachably mounted to the inside of second housing section 135b of the housing 135. The tertiary seal seat 157 defines a central opening configured to permit the passage of the male coupling 154 on the rotary shaft 114. The distal or inboard end of the cartridge shell 136 may be axially urged in sealing contact with a corresponding sealing face on the tertiary seal seat 157, thereby providing a tertiary seal 174 between the tank 112 and the secondary seal 134 to isolate the tank contents from the valve internals of the secondary seal 134 during normal operation. The distal end of the cartridge 132 is used as a clamp valve plug and the front face of the tertiary seal seat 157 provides a mating valve seat. The tertiary seal 174 is, thus, obtained by simply bolting the cartridge 132 in position within the housing 135 without the need for any other dedicated operations.

In the embodiment of FIG. 7, sealing packing material 201 may be provided in a stuffing box 200 about the shell 136. A gland follower 202 projects into the stuffing box 200 and is adjustably tightened thereto for compressing the lubricating and sealing packing material 201 against the shell 136. The cartridge sealing packing material 201 may be tightened to ensure full sealing capability when the extractable cartridge 132 is being extracted or inserted from the housing 135. The cartridge sealing packing material 201 may be replaced when the extractable cartridge 132 is removed from the housing 135. The cartridge sealing packing material 201 may also be replaced when the extractable cartridge 132 is fully in place, that is to say when the rotary shaft 114 distal end portion projects out of the extractable cartridge, and when the first coupling member 154 is in mating engagement with the second coupling member 156 fixed to a tool extending into the tank. The replacement of the cartridge sealing packing material 201 when the extractable cartridge 132 is fully in place is possible because of the sealing capability of the tertiary seal 174, which allows to isolate the tank contents from the valve internals of the secondary seal and therefore the cartridge seal, which is outside of the secondary seal.

The operations for maintaining or replacing the seals of the rotary shaft 114 of the seal arrangement shown in FIG. 7 are the same as with the seal arrangement of FIGS. 1 to 6. The removable flexible coupling 118 is first removed, then the bolts securing the cartridge 132 to the housing 135 are removed and the cartridge 132 is gradually pulled out from the housing 135. During withdrawal, the tightened cartridge sealing packing material 201 maintains a pressure seal to seal the housing 135 and tank 112 while being extracted far enough to allow the secondary seal 134 to move from its open position to its closed position. Once the secondary seal 134 is closed, the cartridge 132 is fully extracted from the housing 135 for servicing the shaft seals and bushings. After having been removed, the packing 150 in stuffing box 148 and/or the cartridge sealing packing material 201 may be readily replaced by un-tightening the gland follower 152 and/or 202 respectively. As with the embodiment shown in FIGS. 1 to 6, during all the maintenance operations, the tank 112 is isolated from the housing 135 by the secondary seal 134, thereby eliminating the need to empty the tank 112 for servicing the shaft seals. After servicing the cartridge 132 is engaged into the housing 135, the secondary seal 134 is moved back to its open position to clear the passage and the cartridge 132 is axially pushed to its fully inserted position, so that the male coupling 154 on the rotary shaft 114 is in mating engagement with the female coupling 156 attached to the screw 110. It is noted that during reinstallation, an injection valve and a drain valve similar to the one shown in the embodiment of FIGS. 1 to 6 may be opened to flush any scale or mud that may have passed from the tank 112 to the housing 135, particularly in the housing section 135*b* and the valve body 164. Thereafter, the cartridge 132 is re-bolted to the housing 135. Finally, the above-mentioned drain valve is closed to allow pressurization of the gap between the cartridge 132 and the housing 135.

The disposition of the secondary seal 34, 134 outside of the tank 12, 112 within the housing 35, 135 and the provision of a tertiary seal 74, 174 between the tank 12, 112 and the secondary seal 34, 134 during process operations allow the system to be used in severe scaling environments. The secondary seal 34, 134 is not exposed to the tank contents and is, thus, not subject to scale build-up. Contamination of the secondary seal 34, 134 by the tank contents can, thus, be prevented.

The tertiary seal 74, 174 is particularly useful in scaling environments by preventing scale and mud from building around the valve member 66, 166 and the associated valve seat in the valve body 64, 164. Indeed, the accumulation of scale or mud or other contaminants from the tank contents could prevent the proper operation of the gate valve. Therefore, the tertiary seal 74, 174 addresses the problem of scaling and/or contamination of the gate valve by at least limiting, during operation, the introduction of solids (e.g. process liquid and/or slurry) within the housing 35, 135 and more particularly in the seat of the valve member 66, 166 in the gate valve body 64, 164. However, it is understood that for non-scaling applications, where the secondary seal 34, 134 does not need to be protected from the tank contents, the tertiary valve 74, 174 could be omitted. It is also understood that the tertiary seal 74, 174 is not limited to compression/clamping type seals. Indeed, other types of seals could be provided for protecting the secondary seal 34, 134 from the tank contents. Also, the tertiary seal could be independent from the cartridge 32, 132.

The above description is meant to be exemplary only, and one skilled in the art will recognize that changes may be made to the embodiments described without departing from the scope of the invention disclosed. For example, while the present invention has particular application to side entry agitators/decanters for large mixing tanks, it is understood that the invention is of general applicability to a variety of devices having rotating shafts extending through a wall of a fluid holding structure. Still other modifications which fall within the scope of the present invention will be apparent to those skilled in the art, in light of a review of this disclosure, and such modifications are intended to fall within the appended claims.

What is claimed is:

1. A seal arrangement for sealing a rotary shaft and a shaft opening defined in a wall of a tank configured for containing a flowable material, comprising a primary seal mounted with the rotary shaft in an extractable cartridge to provide sealing around the rotary shaft, the seal arrangement further comprising a secondary seal operational for closing the shaft opening when removing the primary seal for maintenance or replacement, characterized in that the extractable cartridge is removably insertable in sealing engagement within a housing projecting outwardly from the tank around the shaft opening, and in that the secondary seal comprises an isolation valve mounted to the housing outside of the tank.

2. The seal arrangement defined in claim 1, characterized in that the seal arrangement further comprises a tertiary seal provided between the tank and the secondary seal for isolating the secondary seal from the flowable material in the tank during process operations.

3. The seal arrangement defined in claim 2, characterized in that the tertiary seal is a compression/clamping type seal.

4. The seal arrangement defined in claim 3, characterized in that the compression/clamping type seal is provided at least in part by a distal end of the extractable cartridge which is held axially in sealing contact against a corresponding sealing face inside the housing when the extractable cartridge is securely fastened to the housing in a fully inserted position therein.

5. The seal arrangement defined in claim 4, characterized in that in the fully inserted position, the extractable cartridge extends through a passage defined in the isolation valve of the secondary seal, and to the sealing face.

6. The seal arrangement defined in claim 4, characterized in that the extractable cartridge has a mounting flange at a proximal end thereof, the mounting flange being adapted to be bolted to a corresponding mounting flange of the housing, and wherein bolting of the extractable cartridge to the housing urges the distal end of the extractable cartridge in sealing contact against the sealing face.

7. The seal arrangement defined in claim 4, characterized in that the distal end of the extractable cartridge includes at least one replaceable sealing member.

8. The seal arrangement defined in claim 1, further comprising an injection valve operatively connectable to a source of pressurized fluid for selectively pressurizing a gap between the housing and the extractable cartridge.

9. The seal arrangement defined in claim 8, characterized in that a drain valve is provided on the housing for selectively draining the gap.

10. The seal arrangement defined in claim 1, characterized in that the isolation valve of the secondary seal is a gate valve including a valve body forming part of the housing and defining a passage extending axially in line with the shaft opening of the tank, a valve member movable in a direction transversal to an axial direction of the passage between a normally open position in which the valve member is retracted to allow the passage of the extractable cartridge through the valve body and a closed position in which the valve member closes the passage defined in the valve body once the extractable cartridge has been sufficiently extracted so as to no longer obstruct movement of the valve member.

11. The seal arrangement defined in claim 1, characterized in that the rotary shaft has a distal end portion projecting out of the extractable cartridge, a first coupling member being fixedly mounted to the distal end portion for mating engagement with a second coupling member fixed to a tool extending into the tank, the first and second coupling members being axially disengageable.

12. The seal arrangement defined in claim 11, characterized in that the first and second coupling members have axial splines.

13. The seal arrangement defined in claim 1, characterized in that the primary seal comprises a pair of rotary seals, and in that the extractable cartridge has a shell defining internal seats for accommodating the rotary seals and bushings.

14. The seal arrangement defined in claim 13, characterized in that the primary seal further comprises a stuffing box containing packing material compressed around the rotary shaft by a gland follower, the stuffing box being mounted at an outboard end of the extractable cartridge.

15. A set of removable parts of a seal arrangement comprising an extractable cartridge removably insertable in sealing engagement with a housing of a tank, the extractable cartridge comprising a rotary shaft configured for powering a rotary tool and a primary seal mounted with the rotary shaft and providing sealing around the rotary shaft and the extractable cartridge in which the rotary shaft and the primary seal are mounted, wherein the extractable cartridge further comprises a shell partially enclosing the rotary shaft and containing the primary seal, an end cap at a distal end of the extractable cartridge, with the rotary shaft projecting out of the extractable cartridge through the end cap, and a replaceable seal at the distal end of the extractable cartridge, wherein the replaceable seal is configured to be placed in sealing contact with a sealing face of the housing in which the extractable cartridge is received.

16. A seal arrangement for sealing a tank containing a flowable material, comprising:
   a tank configured for containing a flowable material, the tank having a wall with an opening extending through the wall;
   a housing projecting outwardly from the tank around the opening;
   an extractable cartridge that is removably insertable in sealing engagement within the housing, the extractable cartridge comprising a rotary shaft configured for powering a rotary tool through the opening and a primary seal mounted with the rotary shaft to provide sealing around the rotary shaft; and
   a secondary seal operational for closing the shaft opening when the extractable cartridge is removed from the sealing engagement within the housing, wherein the secondary seal comprises an isolation valve mounted to the housing outside of the tank.

17. The seal arrangement defined in claim 16, wherein the isolation valve of the secondary seal is a gate valve including a valve body forming part of the housing and defining a passage extending axially in line with the shaft opening of the tank, a valve member movable in a direction transversal to an axial direction of the passage between a normally open position in which the valve member is retracted to allow the passage of the extractable cartridge through the valve body and a closed position in which the valve member closes the passage defined in the valve body once the extractable cartridge has been sufficiently extracted so as to no longer obstruct movement of the valve member.

18. The seal arrangement defined in claim 16, wherein the rotary shaft has a distal end portion projecting out of the extractable cartridge, a first coupling member being fixedly mounted to the distal end portion in mating engagement with a second coupling member configured to be fixed to the rotary tool, the first and second coupling members being axially disengageable.

19. The seal arrangement defined in claim 16, characterized in that the seal arrangement further comprises a tertiary seal provided between the tank and the secondary seal for isolating the secondary seal from the flowable material in the tank during process operations.

20. The seal arrangement defined in claim 16, characterized in that the primary seal comprises a pair of rotary seals, and in that the extractable cartridge has a shell defining internal seats for accommodating the rotary seals and bushings.

* * * * *